United States Patent
Xie et al.

(10) Patent No.: US 12,546,822 B2
(45) Date of Patent: Feb. 10, 2026

(54) GRPC-BASED CHIP TEST METHOD, GRPC-BASED CHIP TEST APPARATUS, AND STORAGE MEDIUM

(71) Applicants: Beijing ESWIN Computing Technology Co., Ltd., Beijing (CN); Guangzhou Transa Semi Information Technology Co., Ltd., Guangzhou (CN)

(72) Inventors: Zeliang Xie, Beijing (CN); Yufeng Peng, Beijing (CN); Zuhua Shi, Beijing (CN); Ligang Yuan, Beijing (CN); Huichuang Ma, Beijing (CN)

(73) Assignees: Beijing ESWIN Computing Technology Co., Ltd., Beijing (CN); Guangzhou Transa Semi Information Technology Co., Ltd., Guangzhou (CN)

( * ) Notice: Subject to any disclaimer, the term of this patent is extended or adjusted under 35 U.S.C. 154(b) by 512 days.

(21) Appl. No.: 18/147,887

(22) Filed: Dec. 29, 2022

(65) Prior Publication Data
US 2024/0103075 A1   Mar. 28, 2024

(30) Foreign Application Priority Data
Sep. 22, 2022 (CN) .......................... 202211160244.7

(51) Int. Cl.
*G01R 31/3183* (2006.01)
*G01R 31/302* (2006.01)
(Continued)

(52) U.S. Cl.
CPC ... *G01R 31/31813* (2013.01); *G01R 31/3025* (2013.01); *G01R 31/31725* (2013.01); *G01R 31/3183* (2013.01); *G01R 31/31908* (2013.01)

(58) Field of Classification Search
CPC .......... G01R 31/31813; G01R 31/3181; G01R 31/317; G01R 31/28; G01R 31/00;
(Continued)

(56) References Cited

U.S. PATENT DOCUMENTS

| 2014/0258778 A1 | 9/2014 | Kimm et al. |
| 2016/0098341 A1* | 4/2016 | Pho ..................... G06F 11/3466 714/38.1 |

(Continued)

FOREIGN PATENT DOCUMENTS

| CN | 104268055 A | 1/2015 |
| CN | 109041051 A | 12/2018 |

(Continued)

OTHER PUBLICATIONS

Office action from corresponding Chinese Patent Application No. 202211160244.7 dated May 31, 2025 with search report.

*Primary Examiner* — Mohamed Charioui
(74) *Attorney, Agent, or Firm* — Ladas & Parry, LLP

(57) ABSTRACT

Embodiments of the present application provide a GRPC-based chip test method, a GRPC-based chip test apparatus, and a storage medium. The GRPC-based chip test method comprises: determining a number of to-be-tested chips that actually need to be tested among to-be-tested chips, and issuing a corresponding number of remote instrument call requests according to the number of to-be-tested chips that actually need to be tested; acquiring each of the remote instrument call requests based on a GRPC protocol; and sorting all the remote instrument call requests to form a request execution sequence table, and controlling the test instrument to sequentially test the to-be-tested chips that actually need to be tested according to the request execution sequence table.

19 Claims, 4 Drawing Sheets

(51) Int. Cl.
  *G01R 31/317*  (2006.01)
  *G01R 31/3181*  (2006.01)
  *G01R 31/319*  (2006.01)

(58) Field of Classification Search
  CPC .............. G01R 31/3025; G01R 31/302; G01R 31/31725; G01R 31/3183; G01R 31/31908; G01R 31/31907; G01R 31/2851
  See application file for complete search history.

(56) References Cited

U.S. PATENT DOCUMENTS

2021/0359928 A1* 11/2021 Cundall .............. H04L 41/0213
2022/0100486 A1*  3/2022 Yang ..................... G06F 18/217

FOREIGN PATENT DOCUMENTS

| CN | 110971478 A | 4/2020 |
| CN | 113886265 A | 1/2022 |
| CN | 114325353 A | 4/2022 |
| CN | 216739745 U | 6/2022 |

* cited by examiner

GRPC-BASED CHIP TEST METHOD, GRPC-BASED CHIP TEST APPARATUS, AND STORAGE MEDIUM

CROSS-REFERENCE TO RELATED APPLICATION

The application is based on and claims priority to China Patent Application No. 202211160244.7, filed on Sep. 22, 2022, in the China National Intellectual Property Administration, the disclosures of which are incorporated by reference herein in their entirety.

TECHNICAL FIELD

The present application relates to the field of chip test technical, and in particular, to a GRPC-based chip test method, a GRPC-based chip test apparatus and a storage medium.

BACKGROUND

The purpose of chip test is to reasonably, effectively and quickly check whether all the functional items and performance items of chips meet the chip design requirements.

In the process of chip test, the earlier the problems of chips are found comprehensively, the more the competitiveness of chips can be improved and the waste of manpower and resources can be reduced. However, the existing chip test systems are low in test efficiency.

SUMMARY

In view of the shortcomings in the prior art, the present application provides a GRPC-based chip test method, a GRPC-based chip test apparatus and a storage medium to solve the technical problem of low chip test efficiency in the prior art.

In a first aspect, an embodiment of the present application provides a GRPC-based chip test method, including: determining a number of to-be-tested chips that actually need to be tested among to-be-tested chips, and issuing a corresponding number of remote instrument call requests according to the number of to-be-tested chips that actually need to be tested; acquiring each of the remote instrument call requests based on a GRPC protocol; and sorting all the remote instrument call requests to form a request execution sequence table, and controlling the test instrument to sequentially test the to-be-tested chips that actually need to be tested according to the request execution sequence table.

Optionally, before sorting all the remote instrument call requests to form a request execution sequence table, the GRPC-based chip test method further includes: inserting each of the acquired remote instrument call requests into an instrument request storage stack; directly forming the request execution sequence table from the instrument request storage stack, if the number of original remote instrument call requests in the instrument request storage stack is 0 and the number of the inserted remote instrument call requests is less than or equal to 1; otherwise, sorting all the remote instrument call requests to form a request execution sequence table.

Optionally, sorting all the remote instrument call requests to form a request execution sequence table includes: acquiring test times corresponding to each of the remote instrument call requests; and sorting each of the remote instrument call requests according to an order of the test times from short to long to generate the request execution sequence table.

Optionally, before sorting each of the remote instrument call requests according to the order of the test times from short to long to generate the request execution sequence table, the GRPC-based chip test method further includes: if a new remote instrument call request is inserted into the instrument request storage stack, acquiring test time corresponding to the new remote instrument call request, and sorting all the remote instrument call requests according to the order of the test times from short to long; otherwise, sorting each of the remote instrument call requests according to the order of the test times from short to long to generate the request execution sequence table.

Optionally, sorting each of the remote instrument call requests according to the order of the test times from short to long to generate the request execution sequence table includes: inserting each of the remote instrument call requests into an instrument request execution stack in an order of long test time first in and short test time last in, the instrument request execution stack forming the request execution sequence table.

Optionally, controlling the test instrument to sequentially test the to-be-tested chips that actually need to be tested according to the request execution sequence table includes: calling the corresponding test instrument according to the request execution sequence table, and controlling the test instrument to sequentially test the to-be-tested chips that actually need to be tested according to test times corresponding to the remote instrument call requests in the request execution sequence table.

Optionally, the GRPC-based chip test method further includes: storing test data.

In a second aspect, an embodiment of the present application provides a GRPC-based chip test apparatus, used to implement the GRPC-based chip test method as described in the first aspect. The GRPC-based chip test apparatus includes: a to-be-tested module including a plurality of to-be-tested chips; a test instrument configured to connected to the plurality of to-be-tested chips; a chip test case module connected to the plurality of to-be-tested chips, the chip test case module is configured to issue a corresponding number of remote instrument call requests according to the number of to-be-tested chips that actually need to be tested; and an instrument service call processing module connected in communication to the chip test case module through GRPC, and the instrument service call processing module is configured to acquire each of the remote instrument call requests based on a GRPC protocol, sort all the remote instrument call requests to form a request execution sequence table, and control the test instrument to sequentially test the to-be-tested chips that actually need to be tested according to the request execution sequence table.

Optionally, the chip test case module includes a GRPC client, the instrument service call processing module includes a GRPC server, the GRPC client is connected in communication to the GRPC server through GRPC, and the GRPC client is connected in communication to the plurality of to-be-tested chips.

Optionally, the GRPC-based chip test method further includes: a data processing module, to which the chip test case module is connected to transmit test data to the data processing module for storage.

In a third aspect, an embodiment of the present application provides a computer-readable storage medium having programs, codes or instructions stored thereon that, when executed by at least one processor, implement the GRPC-based chip test method described in the first aspect.

Additional aspects and advantages of the present application will be given in the following description, some of which will become apparent from the following description or appreciated by implementing the present application.

BRIEF DESCRIPTION OF THE DRAWINGS

The above and/or additional aspects and advantages of the present application will become apparent and be readily understood from the following description of embodiments with reference to the accompanying drawings, in which.

REFERENCE NUMERALS

Figure 1:
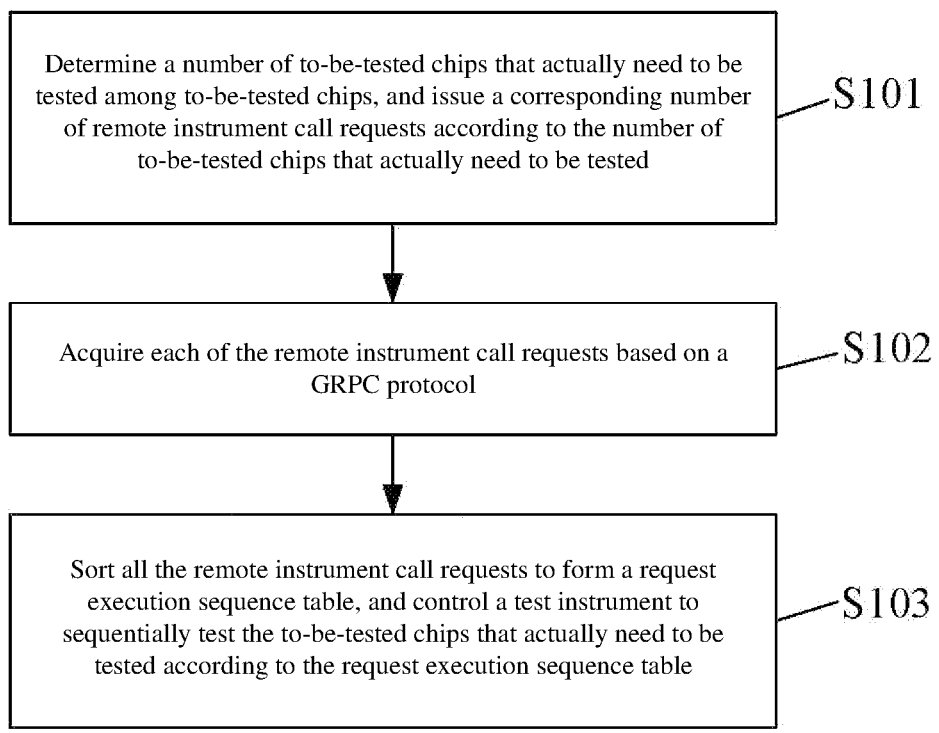
FIG. 1 is a flowchart of a GRPC-based chip test method according to an embodiment of the present application.

10: to-be-tested module; 11: to-be-tested chip; 12: main control board; 20: test instrument; 30: chip test case module; 31: GRPC client; 40: instrument service call processing module; 50: data processing module; 51: web server; 511: frontend; 512: backend; 52: database server; 521: master database; 522: slave database; 523: binary log; 524: I/O thread; 525: SQL thread; 526: relay log.

BEST MODE FOR CARRYING OUT THE INVENTION

Embodiments of the present application will be described below with reference to the accompanying drawings in the present application. It should be understood that the embodiments to be described below with reference to the accompanying drawings are exemplary descriptions for explaining the technical solutions of the embodiments of the present application, and do not limit the technical solutions of the embodiments of the present application.

It may be understood by those skilled in the art that singular forms "a", "an", "said", and "the" may be intended to include plural forms as well, unless otherwise stated. It should be further understood that terms "include/including" used in this specification specify the presence of the stated features, integers, steps, operations, elements and/or components, but not exclusive of being implemented as other features, information, data, steps, operations, elements, components supported in the technical field and/or combinations thereof. It should be understood that, when an element is referred as being "connected" or "coupled" to another element, this element may be directly connected or coupled to the other element, or this element and the other element may be connected through intervening elements. In addition, "connected to" or "coupled to" as used herein may include wireless connection or coupling. The term "and/or" as used herein indicates at least one of the items defined by the term, e.g., "A and/or B" may be implemented as "A", or as "B", or as "A and B".

To make the purposes, technical solutions and advantages of the present applicant clearer, the implementations of the present application will be further described below in detail with reference to the accompanying drawings.

Chip, also known as microcircuit, microchip, integrated circuit (referred to as IC), refers to a silicon wafer containing an integrated circuit, which is small in size and is an important part of electronic devices such as computers.

Due to the fine structure of chips, the complex manufacturing process and the cumbersome process, it will inevitably leave potential defects in the production process, so that the manufactured chips cannot all meet the standard requirements, and may fail due to various reasons at any time. Therefore, in order to ensure the quality of chips, chips are usually tested (including multiple test items such as electrical parameter measurement and functional test) in order to separate good and bad products.

The purpose of chip test is to reasonably, effectively and quickly check whether all the functional items and performance items of chips meet the chip design requirements. The test process of chips involves test methods, test cases, test environments, test conditions, and pass criteria. In the process of chip test, the earlier the problems of chips are found comprehensively, the more the competitiveness of chips can be improved and the waste of manpower and resources can be reduced. Meanwhile, obtaining more meaningful test data can provide useful information to the design and mass production, so that the failure modes can be effectively analyzed and thus the design and manufacturing yield can be improved.

The existing chip test system has large coverage, many products need to be adapted, and the test time is long. Moreover, when testing chips, only one-to-one testing is supported, that is, one test system can measure only one chip at a time, which greatly decreases the instrument utilization and the test efficiency. These factors will increase the difficulty and complexity of chip test, thereby increasing the test time and test cost of chips.

The GRPC-based chip test method, GRPC-based chip test apparatus and storage medium according to the present application aim to solve the above technical problems in the prior art.

First of all, terms involved in the present application will be introduced and explained below.

RPC (Remote Procedure Call), just as the name implies, means that we can call functions/methods on a remote server. RPC is used to display or print data after processing the data. The principle of the SAP (System Applications and Products, which is the software name of the SAP's product-Enterprise Management Solution) system RPC call is that the third-party client program calls a standard or custom function within SAP through an interface, obtains the data returned by the function, and display or print the data after processing the data.

RPC server refers to the remote procedure call protocol: a protocol that requests services from a remote computer program over network without knowing the underlying network technology. The RPC protocol allows getting the result of a problem in the same format regardless of where it is executed. It may be local or in a remote server with better resources.

GRPC is a high-performance, open-source, general-purpose RPC framework launched by Google. It is designed and developed based on the HTTP/2 protocol standard. It uses the Protocol Buffers data serialization protocol by default, and supports multiple development languages.

GRPC is used for high-performance communication between services. This is an efficient way to connect services written in different languages with pluggable supports (for load balancing, tracing, health checking and authentication). GRPC has been widely used in scenarios that have strict constraints on interfaces or transfer a large amount of data.

HTTP/2, or Hypertext Transfer Protocol Version 2, originally named HTTP 2.0, abbreviated as h2 (encrypted connection based on TLS/1.2 or above) or h2c (non-encrypted connection), is the second major version of the HTTP protocol.

HTTP/2 allows multiplexing, so multiple requests and responses can be processed simultaneously. It supports bidirectional communication as well as traditional request/response. GRPC is designed based on the HTTP/2 standard, which brings the characteristics such as multiplexing requests on bidirectional flow, flow control, header compression, and single TCP (Transmission Control Protocol, which is a connection-oriented, reliable, byte stream-based transport layer communication protocol) connection. These characteristics make it perform better on mobile devices, save power and space. GRPC allows loose coupling between the server and the client. In practice, the client opens a long-term connection to the GRPC server and will open a new HTTP/2 stream for each RPC call.

Protocol Buffers (often abbreviated as protobuf) is a data description language developed by Google, which can serialize structured data and can be used for data storage, communication protocols, etc. ProtoBuf is a data expression method, a data file ending with .proto, analogous to json, xml, etc. For the ProtoBuf data source, the protoc tool may be used to generate access classes in various languages.

GRPC uses protobuf protocol buffers as the interface definition languages for serialization and communication. Protocol buffers may describe the structure of data, and codes may be generated from this description to generate or parse a byte stream representing the structured data. The binary data format makes communication easier. Of course, GRPC may also be used with other data formats.

Stack is a linear list with limited operations: insert and delete operations can only be done to the end of the list. This end (that is, the end of the list) is called the top of the stack, and the other end is called the bottom of the stack. Inserting a new element into a stack is also called pushing, which is to placing a new element on top of the top element of the stack to make it a new top element of the stack. Deleting an element from a stack is also called popping, which is to delete the top element of the stack, making its adjacent element the new top element of the stack.

In the computer field, a "stack" refers to a place where data is temporarily stored.

A stack, as a data structure, is a special linear list that can only be inserted and deleted at one end. It stores data in last-in, first-out order. The data entered first is pushed to the bottom of the stack, and the last data is at the top of the stack. When data needs to be read, data is popped from the top of the stack (that is, the last data is read out first).

The technical solutions of the present application and how to solve the above technical problems by the technical solutions of the present application will be described below by specific embodiments in detail. It should be noted that the following implementations may refer to, learn from, or combine with each other, and the same terms, similar features, and similar implementation steps in different implementations will not be described repeatedly.

An embodiment of the present application provides a GRPC-based chip test method. The schematic flowchart of the method is shown in FIG. 1. The method includes:

S101: determining a number of to-be-tested chips that actually need to be tested among to-be-tested chips, and issuing a corresponding number of remote instrument call requests according to the number of to-be-tested chips that actually need to be tested;

S102: acquiring each of the remote instrument call requests based on a GRPC protocol; and S103: sorting all the remote instrument call requests to form a request execution sequence table, and controlling the test instrument to sequentially test the to-be-tested chips that actually need to be tested according to the request execution sequence table.

In the GRPC-based chip test method provided in the embodiment of the present application, first, the number of to-be-tested chips that actually need to be tested among to-be-tested chips is determined, and a corresponding number of remote instrument call requests are issued according to the number of to-be-tested chips that actually need to be tested; then, each of the remote instrument call requests is acquired based on a GRPC protocol; and then, all the remote instrument call requests are sorted to form a request execution sequence table, and the test instrument is controlled to sequentially test the to-be-tested chips that actually need to be tested according to the request execution sequence table.

Since the GRPC protocol has the characteristics of multiplexing requests, it can process multiple requests and responses at the same time. Therefore, in the embodiment of the present application, based on the GRPC protocol, at least one remote instrument call request can be simultaneously acquired, and response can be made to each remote instrument call request.

By the GRPC protocol, the chip test method in the present application can perform distributed testing on a plurality of to-be-tested chips 11 at the same time. The test speed and test efficiency of chips are effectively improved. By executing the test according to the request sequence table, the use efficiency and utilization of the test instrument 20 can be can be effectively improved, the test resources can be optimized, and thus the test time and test cost can be reduced.

By testing the to-be-tested chips with the GRPC-based chip test method in the embodiment of the present application, it is possible to reasonably, effectively and quickly check whether all the functional items and performance items of chips meet the chip design requirements, and to timely and comprehensively find out the problems of chips, thereby improving the competitiveness of chips and reducing the waste of manpower and resources.

Figure 4:
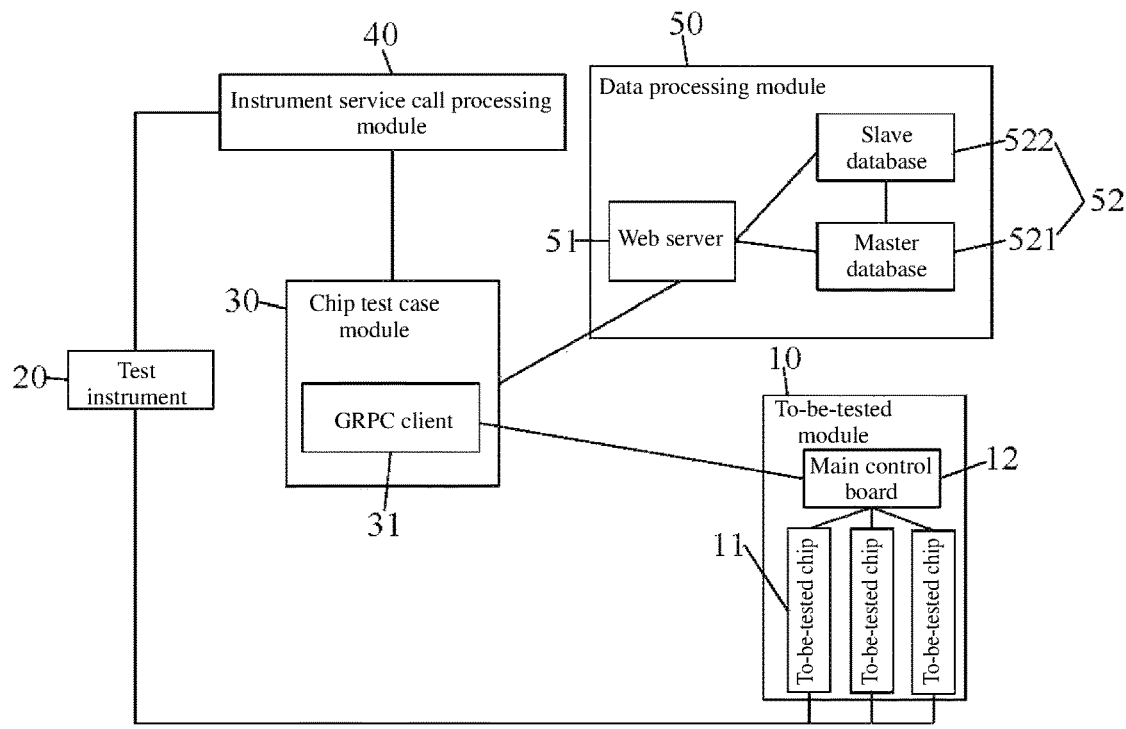
FIG. 4 is a schematic structure diagram of a GRPC-based chip test apparatus according to an embodiment of the present application.

Optionally, as shown in FIG. 4, in the embodiment of the present application, the chip test case module 30 can acquire the number of to-be-tested chips 11 and information of each to-be-tested chip 11 (including information of each to-be-tested chip 11, ID information corresponding to each to-be-tested chip 11, etc.), for example, acquire information of each to-be-tested chip 11 by scanning the two-dimensional codes provided on each to-be-tested chip 11.

In an optional implementation of the present application, the step S101 of determining the number of to-be-tested chips that actually need to be tested among to-be-tested chips, and issuing a corresponding number of remote instrument call requests according to the number of to-be-tested chips that actually need to be tested includes: the chip test case module 30 automatically issues remote instrument call requests according to the number of to-be-tested chips that actually need to be tested, so that the instruments that are requested to be called can test the corresponding to-be-tested chips that actually need to be tested. In this way, the chip test case module 30 can control the corresponding tests to each to-be-tested chip 11.

Of course, in another optional implementation of the present application, according to actual needs or actual conditions, the step S101 of determining the number of to-be-tested chips that actually need to be tested among to-be-tested chips, and issuing a corresponding number of remote instrument call requests according to the number of to-be-tested chips that actually need to be tested includes: at least one to-be-tested chip 11 issues a test request; and the chip test case module 30 acquires the test request and issues at least one remote instrument call request according to the number of test requests.

Specifically, in the embodiment of the present application, as shown in FIG. 4, at least one to-be-tested chip 11 issues a test request to request to use the corresponding test instrument 20 to test the to-be-tested chips 11; and the chip test case module 30 is configured to acquire the test request, and issue at least one remote instrument call request to the instrument service call processing module 40 according to the number of test requests.

It should be noted that, in the embodiment of the present application, the number of to-be-tested chips 11 that issue a test request is the same as and in one-to-one correspondence to the number of remote instrument call requests issued by the chip test case module 30. The number of to-be-tested chips 11 that issue a test request is less than or equal to the number of all to-be-tested chips 11, that is, some to-be-tested chips 11 among all to-be-tested chips 11 may issue a test request, or all the to-be-tested chips 11 may issue a test request, which may be selected according to actual needs.

It should be noted that, in the embodiment of the present application, the test instruments 20 requested to be used for different to-be-tested chips 11 may be the same or different.

Optionally, in the embodiment of the present application, acquiring each of the remote instrument call requests based on a GRPC protocol includes: based on the GRPC protocol, the instrument service call processing module 40 acquires each of the remote instrument call requests issued by the chip test case module 30 (as shown in FIG. 4).

In the embodiment of the present application, as shown in FIG. 4, the test process of chips is decomposed into a chip test case module 30 and an instrument service call processing module 40 through the GRPC protocol, and the chip test case module 30 is connected in communication to the instrument service call processing module 40 through GRPC. The instrument service call processing module 40 can acquire each of the remote instrument call requests issued by the chip test case module 30, and respond to each of the remote instrument call requests. In this way, the development work for chip test is reduced, and multiple chips can be tested at the same time.

Figure 2:
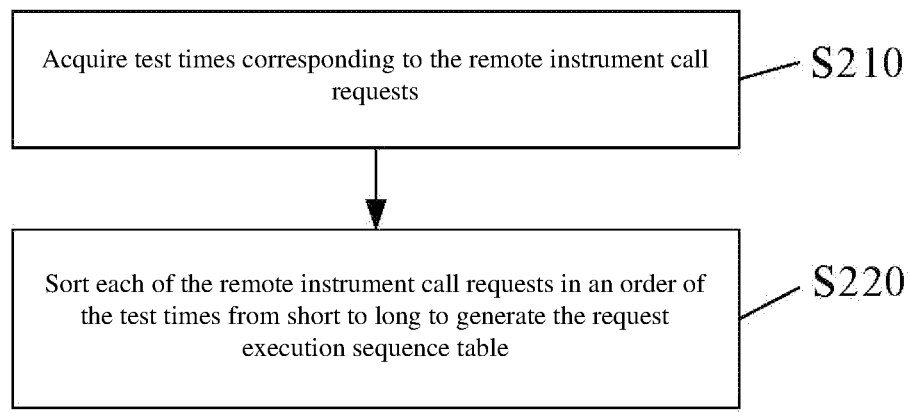
FIG. 2 is a flowchart of forming a request execution sequence table in the GRPC-based chip test method according to an embodiment of the present application.

Optionally, as shown in FIG. 2, in the embodiment of the present application, sorting all the remote instrument call requests to form a request execution sequence table includes:

S210: acquiring test times corresponding to the remote instrument call requests; and S220: sorting each of the remote instrument call requests according to an order of the test times from short to long to generate the request execution sequence table.

Specifically, in the embodiment of the present application, as shown in FIG. 4, after the instrument service call processing module 40 acquires each of the remote instrument call requests issued by the chip test case module 30 based on the GRPC protocol, the instrument service call processing module 40 sorts the remote instrument call requests according to the test logic to generate a request execution sequence table, and then, the instrument service call processing module 40 controls the corresponding test instrument 20 to test the to-be-tested chips 11 according to the request execution sequence table, therefore, the function of separation of the test logic and the instrument control from each other is realized.

The GRPC-based chip test method in the embodiment of the present application can realize not only the distributed testing of multiple chips at the same time, but also the separation of test logic and instrument control by using the remote call service. The test speed of chips and the utilization of instruments are effectively improved, the test resources are optimized, and thus the test cost is reduced.

Figure 3:
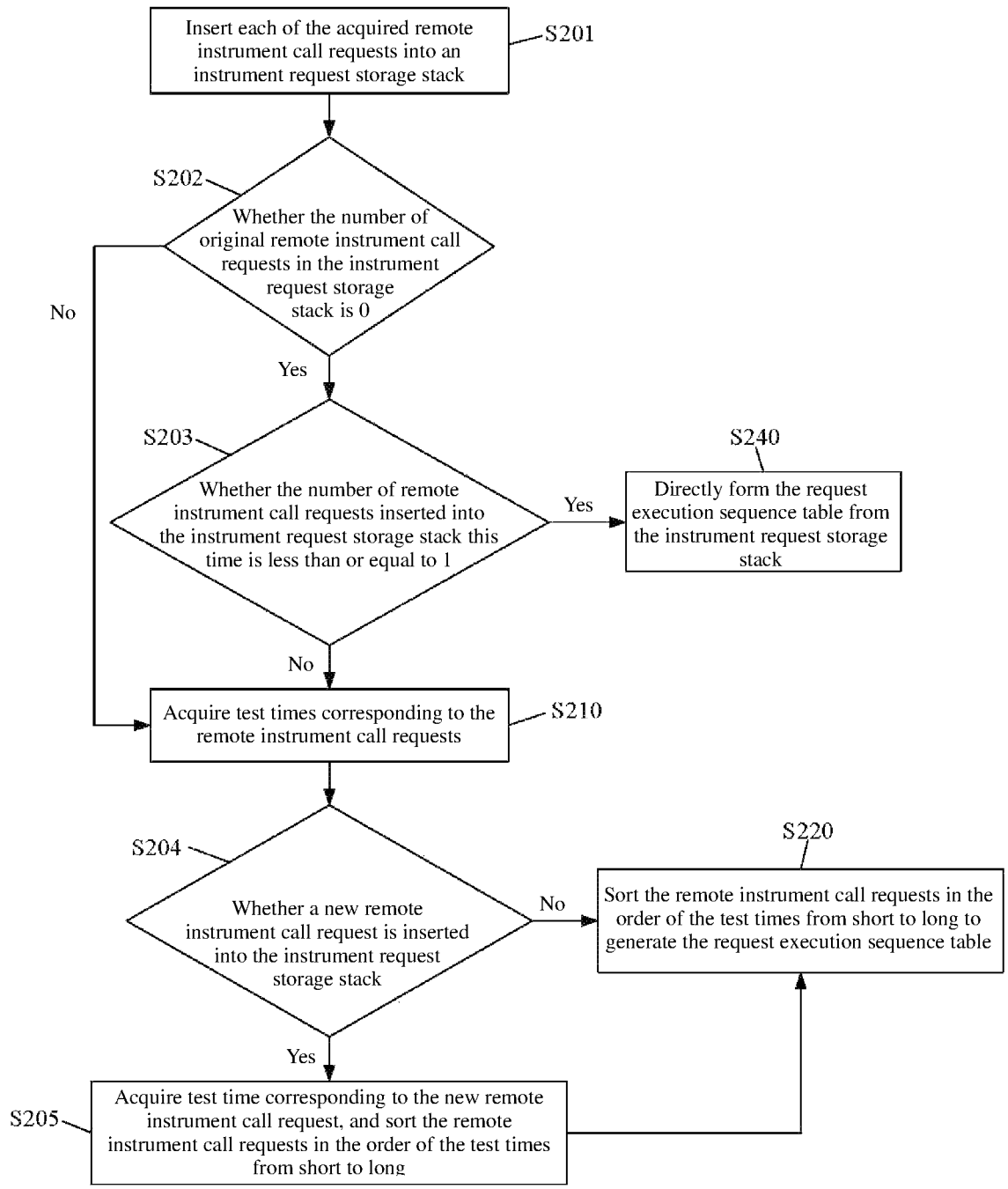
FIG. 3 is a specific flowchart of forming a request execution sequence table in the GRPC-based chip test method according to an embodiment of the present application.

Optionally, as shown in FIG. 3, in the embodiment of the present application, before sorting all the remote instrument call requests to form a request execution sequence table, the GRPC-based chip test method further includes:

S201: inserting each of the acquired remote instrument call requests into an instrument request storage stack; and directly forming the request execution sequence table from the instrument request storage stack, if a number of original remote instrument call requests in the instrument request storage stack is 0 and the number of the inserted remote instrument call requests is less than or equal to 1; otherwise sorting all the remote instrument call requests to form a request execution sequence table.

Specifically, as shown in FIG. 3, in the embodiment of the present application, the GRPC-based chip test method further includes step S202 and step S203. The step S202 is to determine whether the number of original remote instrument call requests in the instrument request storage stack is 0. If so, step S203 is executed to determine whether the number of remote instrument call requests inserted into the instrument request storage stack this time is less than or equal to 1. If it is less than or equal to 1, step S240 is executed to directly form the request execution sequence table from the instrument request storage stack.

If the number of original remote instrument call requests in the instrument request storage stack is 0, and the number of remote instrument call requests inserted into the instrument request storage stack this time is greater than 1, step S210 is executed to acquire test times corresponding to the remote instrument call requests.

If the number of original remote instrument call requests in the instrument request storage stack is not 0, step S210 is executed to acquire test times corresponding to the remote instrument call requests.

It should be noted that the execution order of the step S210 (acquiring test times corresponding to the remote instrument call requests) and the step S201 (inserting each of the acquired remote instrument call requests into an instrument request storage stack) is not limited in the present application. The appropriate execution sequence may be selected according to the actual situation and actual needs. For example, the step S210 is executed first to acquire test times corresponding to the remote instrument call requests, and then the step S201 is executed to insert each of the acquired remote instrument call requests into an instrument request storage stack; or, the step S201 is executed first to insert each of the acquired remote instrument call requests into an instrument request storage stack, and then the step S210 is executed to acquire test times corresponding to the remote instrument call requests.

It should be noted that the execution order of the step S201 (inserting each of the acquired remote instrument call requests into an instrument request storage stack) and the step S202 (determining whether the number of original remote instrument call requests in the instrument request storage stack is 0) is not limited in the present application. The appropriate execution sequence may be selected according to the actual situation and actual needs. For example, the step S201 is executed first to insert each of the acquired remote instrument call requests into an instrument request storage stack, and then the step S202 is executed to determine whether the number of original remote instrument call requests in the instrument request storage stack is 0; or, the step S202 is executed first to determine whether the number of original remote instrument call requests in the instrument request storage stack is 0, and then the step S201 is executed to insert each of the acquired remote instrument call requests into an instrument request storage stack.

Optionally, in the embodiment of the present application, before sorting each of the remote instrument call requests according to an order of the test times from short to long to generate the request execution sequence table, the GRPC-based chip test method further includes: if a new remote instrument call request is inserted into the instrument request storage stack, acquiring test time corresponding to the new remote instrument call request, and sorting all the remote instrument call requests according to the order of the test times from short to long; otherwise, sorting each of the remote instrument call requests according to the order of the test times from short to long to generate the request execution sequence table.

Specifically, as shown in FIG. 3, in the embodiment of the present application, the GRPC-based chip test method further includes a step S204 of determining whether a new remote instrument call request is inserted into the instrument request storage stack. If so, step S205 is executed to acquire test time corresponding to the new remote instrument call request, and sort each of the remote instrument call requests according to the order of the test times from short to long. If not, Step S220 is executed to sort the remote instrument call requests according to the order of the test times from short to long to generate the request execution sequence table.

It should be noted that the step S204 in the present application is after the step S201, that is, the step S201 is executed first, followed by the step S204.

It should be noted that, in some specific implementations, a new remote instrument call request may be continuously inserted into the instrument request storage stack. In order to prevent the endless loop of repeating the execution of the step S204, in the embodiment of the present application, the number of executions of the step S204 or the execution time of the step S204 may be limited. Of course, the execution time of the step S204 must ensure that the step S204 can be executed at least once.

Optionally, in the embodiment of the present application, sorting each of the remote instrument call requests according to the order of the test times from short to long to generate the request execution sequence table includes: inserting each of the remote instrument call requests into an instrument request execution stack in an order of long test time first in and short test time last in. The instrument request execution stack forms the request execution sequence table.

Since stack is a special linear list where inserting and deleting operations can only be done at one end of the list. It stores data in last-in, first-out order. The data entered first is pushed to the bottom of the stack, and the last data is at the top of the stack. When data needs to be read, data is popped from the top of the stack. That is, the last pushed data is read out by the first, and the first pushed data is read out by the last. Therefore, in the embodiment of the present application, in an order of long test time first in and short test time last in, each of the remote instrument call requests is inserted into the instrument request execution stack. Then, when reading data in the instrument request execution stack, that is, when controlling the test instrument 20 to sequentially test the to-be-tested chips 11 according to the request execution sequence table, to-be-tested chip 11 with short requested test time is tested first, to-be-tested chip 11 with long requested test time is tested later. The time for queuing the to-be-tested chips 11 for testing can be reduced, therefore, the test speed and test efficiency of chips can be effectively improved, the use efficiency and utilization of the test instrument 20 can be effectively improved, and the test resources can be optimized, and thus, the test time and test cost can be reduced.

Optionally, in the embodiment of the present application, controlling the test instrument to sequentially test the to-be-tested chips that actually need to be tested according to the request execution sequence table includes: calling the corresponding test instrument 20 according to the request execution sequence table, and controlling the test instrument 20 to sequentially test the to-be-tested chips that actually need to be tested according to test times corresponding to the remote instrument call requests in the request execution sequence table.

Optionally, the GRPC-based chip test method according to the embodiment of the present application further includes: storing test data.

In the GRPC-based chip test method according to the embodiment of the present application, storing the test data facilitates subsequent reading and use of the test data. On one hand, the accuracy of tests can be checked and analyzed by the stored test data; and on the other hand, the stored test data can be used as the basis for follow-up tests to guide follow-up tests. Some meaningful test data can in turn provide useful information to the design and mass production, so that the failure modes can be effectively analyzed and thus the design and manufacturing yield can be improved.

Based on the same inventive concept, an embodiment of the present application provides a GRPC-based chip test apparatus. The schematic structure diagram of the GRPC-based chip test apparatus is shown in FIG. 4. The GRPC-based chip test apparatus is configured to implement the GRPC-based chip test method described above. The GRPC-based chip test apparatus includes: a to-be-tested module 10, a test instrument 20, a chip test case module 30 and an instrument service call processing module 40. The to-be-tested module 10 includes a plurality of to-be-tested chips 11; the test instrument 20 is connected to the plurality of to-be-tested chips 11; the chip test case module 30 is connected to the plurality of to-be-tested chips 11, and configured to issue a corresponding number of remote instrument call requests according to the number of to-be-tested chips that actually need to be tested; and the instrument service call processing module 40 is connected in communication to the chip test case module 30 through GRPC, and configured to acquire each of the remote instrument call requests based on a GRPC protocol, sort all the remote instrument call requests to form a request execution sequence table, and control the test instrument to sequentially test the to-be-tested chips that actually need to be tested according to the request execution sequence table.

In the embodiment of the present application, the chip test case module 30 is connected to the plurality of to-be-tested chips 11, and configured to issue a corresponding number of remote instrument call requests according to the number of to-be-tested chips that actually need to be tested. The instrument service call processing module 40 is connected in communication to the chip test case module 30 through GRPC, and configured to acquire each of the remote instrument call requests based on a GRPC protocol, sort all the remote instrument call requests to form a request execution sequence table, and control the test instrument 20 to sequentially test the to-be-tested chips 11 that actually need to be tested according to the request execution sequence table.

Since the GRPC protocol has the characteristics of multiplexing requests, it can process multiple requests and responses at the same time. Therefore, in the embodiment of the present application, based on the GRPC protocol, at least one remote instrument call request can be simultaneously acquired, and response can be made to each remote instrument call request.

By the GRPC protocol, the chip test apparatus in the present application can perform distributed testing on a plurality of to-be-tested chips 11 at the same time. The test speed and test efficiency of chips can be effectively improved, the use efficiency and utilization of the test instruments 20 can be effectively improved, and the test resources can be optimized. Thus, the test time and test cost can be reduced.

By testing the to-be-tested chips 11 by the GRPC-based chip test apparatus in the embodiment of the present application, it is possible to reasonably, effectively and quickly check whether all the functional items and performance items of chips meet the chip design requirements, and to timely and comprehensively find out the problems of chips, thereby improving the competitiveness of chips and reducing the waste of manpower and resources.

Specifically, as shown in FIG. 4, in the embodiment of the present application, the instrument service call processing module 40 calls the corresponding test instrument 20 according to the request execution sequence table, and controls the test instrument 20 to sequentially test the to-be-tested chips that actually need to be tested according to test times corresponding to the remote instrument call requests in the request execution sequence table.

In an optional implementation of the present application, the chip test case module 30 is configured to issue a corresponding number of remote instrument call requests according to the number of to-be-tested chips that actually need to be tested, including: the chip test case module 30 automatically sends remote instrument call requests according to the number of to-be-tested chips that actually need to be tested, so that the instruments that are requested to be called can test the corresponding to-be-tested chips that actually need to be tested. In this way, the chip test case module 30 can control the corresponding tests to each to-be-tested chip 11.

Of course, in another optional implementation of the present application, according to actual needs or actual conditions, the chip test case module 30 is configured to issue a corresponding number of remote instrument call requests according to the number of to-be-tested chips that actually need to be tested, including: at least one to-be-tested chip 11 issues a test request; and the chip test case module 30 acquires the test request and issues at least one remote instrument call request according to the number of test requests.

Optionally, as shown in FIG. 4, in the embodiment of the present application, the chip test case module 30 includes a GRPC client 31, the instrument service call processing module 40 includes a GRPC server, the GRPC client 31 is connected in communication to the GRPC server through GRPC, and the GRPC client 31 is connected in communication to the plurality of to-be-tested chips 11.

In the embodiment of the present application, the test process of chips is decomposed into a chip test case module 30 and an instrument service call processing module 40 through the GRPC protocol, and the chip test case module 30 is connected in communication to the instrument service call processing module 40 through GRPC. The instrument service call processing module 40 can acquire each of the remote instrument call requests issued by the chip test case module 30, and respond to each of the remote instrument call requests. In this way, the development work for chip test is reduced, and multiple chips can be tested at the same time.

In the embodiment of the present application, each to-be-tested chip 11 has an ID (for example, a serial number) that is used to represent its own identity information and to distinguish its identity information from the identity information of other to-be-tested chips. The chip test case module 30 can acquire the number of to-be-tested chips 11, and can acquire the information of each to-be-tested chip 11, the ID information corresponding to each to-be-tested chip 11, and the information of the instrument requested by each to-be-tested chip 11, etc. There is a one-to-one correspondence among each remote instrument call request issued by the chip test case module 30, the information of each to-be-tested chip 11, the ID of each to-be-tested chip 11, and the information of the instrument called for each to-be-tested chip 11.

In the embodiment of the present application, the instrument service call processing module 40 includes protocol buffers (that is, custom message service files in which all instrument message request interfaces will be defined) and request call algorithms used to process GRPC instrument operation requests from the chip test case module 30. By designing request call algorithms on the instrument service call processing module 40, the utilization of instruments is improved and the entire test time is shortened.

Specifically, the request call process of the request call algorithms in the instrument service call processing module 40 is as follows:

1. When the instrument service call processing module 40 receives remote instrument call requests from the chip test case module 30, the instrument service call processing module 40 first determines whether the internal instrument request storage stack is empty; if it is empty, then determines whether the number of remote instrument call requests is less than or equal to 1; and if it is not empty, acquires test time corresponding to each of the remote instrument call requests.

2. The number of remote instrument call requests this time is determined; if the number of remote instrument call requests is less than or equal to 1, the remote instrument call request are pushed into the instrument request execution stack, the remote instrument call request is executed according to the instrument request execution stack, and the instrument operation information is printed; and if the number of remote instrument call requests is greater than 1, test time corresponding to each of the remote instrument call requests is acquired.

3. After acquiring test times corresponding to the remote instrument call requests, the remote instrument call requests are sorted in an order of the test times from long to short.

4. Then, it is determined whether there is a new remote instrument call request inserted into the instrument request execution stack. If there is no new remote instrument call request inserted at present, the remote instrument call requests are inserted into the instrument request execution stack in an order of long test time first in and short test time last in, the instrument request execution stack forms a request execution sequence table, the request on the top of the stack is executed, and then, the instrument operation information is printed. If there is a new remote instrument call request inserted at present, test time corresponding to each new remote instrument call request is acquired, and all remote instrument call requests are sorted in an order of the test times from short to long; then, the remote instrument call requests are inserted into the instrument request execution stack in an order of long test time first in and short test time last in, the instrument request execution stack forms a request execution sequence table, and the request on the top of the stack is executed; and then, the instrument operation information is printed.

The GRPC-based chip test apparatus in the embodiment of the present application can realize not only the distributed testing of multiple chips at the same time, but also the separation of test logic and instrument control by using the remote call service. The test speed of chips and the utilization of instruments are effectively improved, the test resources are optimized, and thus the test cost is reduced.

Optionally, as shown in FIG. 4, in the embodiment of the present application, the to-be-tested module 10 includes a main control board 12, an expansion board for chip test, and a plurality of to-be-tested chips 11. The main control board 12 is connected to the expansion board for chip test through an SPI (Serial Peripheral Interface) bus. A plurality of to-be-tested chips 11 are arranged on the expansion board for chip test. The main control board 12 is connected in communication to the chip test case module 30 to issue a test request to the chip test case module 30. The plurality of to-be-tested chips 11 are connected to the test instrument 20 to test the to-be-tested chips 11 by the test instrument 20.

Optionally, in the embodiment of the present application, the main control board 12 is the main control board of an STM32 controller or an FPGA (Field-Programmable Gate Array) controller.

Optionally, in the embodiment of the present application, the to-be-tested module 10 and the test instrument 20 are connected through a cable.

Optionally, in the embodiment of the present application, the test instrument 20 and the to-be-tested chips 11 are connected through an RF cable.

Optionally, in the embodiment of the present application, the test instrument 20 includes chip test instruments, such as a switch box, a signal generator (SG), a power supply (POWER), a digital baseband output and input device (IQ Box), a spectrum analyzer (SA), etc.

Optionally, as shown in FIG. 4, the GRPC-based chip test apparatus according to the embodiment of the present application further includes: a data processing module 50. The chip test case module 30 is connected to the data processing module 50 to transmit the test data to the data processing module 50 for storage.

Optionally, in the embodiment of the present application, the chip test case module 30 acquires the request execution sequence table, and transmits the request execution sequence table to the data processing module 50 for storage.

In the embodiment of the present application, the chip test case module 30 is connected to the to-be-tested chips 11 and can acquire the information of the to-be-tested chips 11 (for example, the chip parameter information, the test request issue frequency and other information). The chip test case module 30 is connected to the instrument service call processing module 40. The instrument service call processing module 40 can feed the request execution sequence table back to the chip test case module 30, so that the chip test case module 30 acquires the request execution sequence table data. The chip test case module 30 can transmit the information of the to-be-tested chips 11, the request execution sequence table and other data to the data processing module 50 for storage.

In this embodiment of the present application, the data processing module 50 can not only store the above-mentioned data, but also can display the above-mentioned data according to actual needs, so as to facilitate reading the data.

It should be noted that, in the embodiment of the present application, the chip test case module 30 can transmit the test data (including the information of the to-be-tested chips 11, the request execution sequence table and other information) to the data processing module 50 in real time. Of course, in some optional implements, it may also be set that the chip test case module 30 intermittently transmits the test data (including the information of the to-be-tested chips 11, the request execution sequence table and other information) to the data processing module 50 at certain time intervals.

Figure 5:
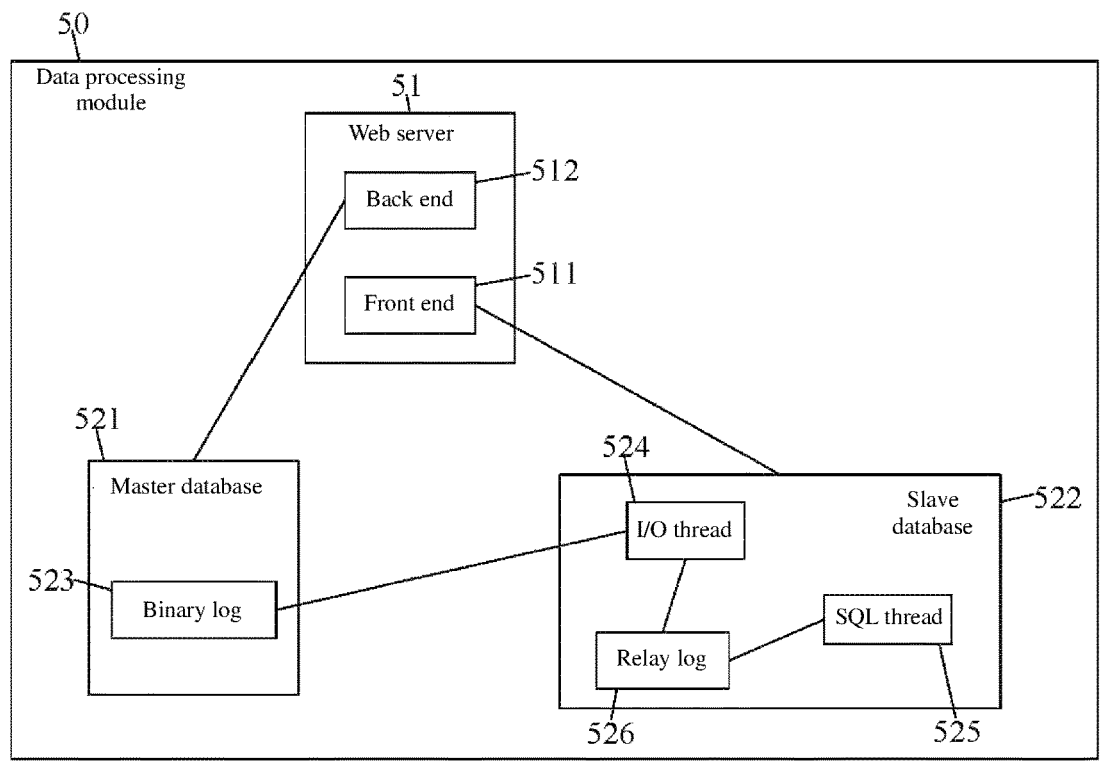
FIG. 5 is a schematic structure diagram of a data processing module in the GRPC-based chip test apparatus according to an embodiment of the present application.

Specifically, as shown in FIGS. 4 and 5, in the embodiment of the present application, the data processing module 50 includes a web server 51 and a database server 52. The chip test case module 30 is connected to the web server 51 over network. The web server 51 is used to write the test data into the database server 52 to store the test data. The web server 51 is used to read and display the test data in the database server 52.

Specifically, in the embodiment of the present application, the web server 51 is a website which is used to process and analyze the test data.

Specifically, in the embodiment of the present application, the database server 52 is an MYSQL server (MySQL is a relational database management system, and the relational database stores data in different tables instead of storing all data in a large warehouse, which increases the speed and improves the flexibility).

Specifically, as shown in FIG. 4, in the embodiment of the present application, the chip test case module 30 is connected to the web server 51 over network, and the web server 51 is connected to the database server 52. The database server 52 includes a master database 521 and a slave database 522. The master database 521 is used to store the test data transmitted by the chip test case module 30, and the slave database 522 is synchronized with the master database 521 in data. The web server 51 performs a write operation on the master database 521 to write the test data transmitted by the chip test case module 30 into the master database 521. The web server 51 performs a read operation on the slave database 522 to read the test data from the slave database 522 and display the test data.

Specifically, in the embodiment of the present application, the main database 521 records the test data in a binary log 523.

The slave database 522 detects whether the test data recorded in the binary log 523 changes through an I/O thread 524 (in the embodiment of this application, "change" refers to the update of the test data recorded in the binary log 523, that is, it is a change as long as the test data is updated, no matter whether the value of the test data is changed or not). When a change occurs, the test data recorded in the binary log 523 is read to a relay log 526.

The slave database 522 updates the measurement data in the relay log 526 to the slave database 522 through an SQL thread 525 to synchronize the slave database 522 with the master database 521 in data.

The operating principles of the chip test case module 30 and the data processing module 50 are as follows:

The front end 511 of the web server 51 performs a read operation on the data in the slave database 522 through Ajax requests (Asynchronous Javascript And XML, a web page development technology for creating interactive web page applications) to update the data in the slave database 522 in real time. The backend 512 performs a write operation on the main database 521 to update the data in the main database 521. The read operation and the write operation are separated to reduce the stress of the database server 52.

Once the data in the master database 521 is changed, the master database 521 will record the change of the data in the binary log 523. The slave database 522 will initiate two threads: I/O thread 524 and SQL thread 525. The I/O thread 524 will detect whether the binary log in the main database 521 changes within a certain period of time. If the binary log in the main database 521 changes, the I/O thread 524 will read the content in the binary log in the main database 521 into the relay log 526 of the slave database 522. The SQL thread 525 will update the content in the relay Log to the local database, so that the data in the slave database 522 and the data in the master database 521 are consistent, to achieve data synchronization.

It should be noted that, in the embodiment of the present application, the web server 51, the database server 52, and the connection between the web server 51 and the database server 52 are all similar to those in the prior art. More details about the specific structures of the web server 51 and the database server 52 will not be repeated here.

Based on the same inventive concept, an embodiment of the present application provides a computer-readable storage medium having programs, codes or instructions stored thereon that, when executed by at least one processor, implement the GRPC-based chip test method described above, so that various optional implementations of the GRPC-based chip test method provided in the embodiment of the present application are realized.

The computer-readable storage medium according to the embodiment of the present application is applicable to various optional implementations of any of the foregoing GRPC-based chip test methods, and details will not be described herein again.

In the embodiment of the present application, the test process of the GRPC-based chip test method, the GRPC-based chip test apparatus and the storage medium is as follows:

1. The test instrument 20 and the to-be-tested module 10 are connected through an RF cable.

2. The chip test case module 30 is connected to the data processing module 50 over network, and instantiates (refers to creating objects by using classes in object-oriented programming, a process of converting an abstract conceptual class into a real object of the class) the built-in GRPC client 31 based on the number of to-be-tested chips 11 on the to-be-tested module 10, to start the test.

3. When the chip test case module 30 needs to request for instruments, it issues remote instrument call requests to the instrument service call processing module 40 through the GRPC protocol. The instrument service call processing module 40 parses the remote instrument call requests from the chip test case module 30 through the protocol buffers, controls the test instrument 20 to execute the request command, and transmits the request result, that is, the request execution sequence table, to the chip test case module 30 through the protocol buffers.

Specifically, in the embodiment of the present application, after the instrument service call processing module 40 receives the remote instrument call requests from the chip test case module 30, the instrument service call processing module 40 first determines whether the internal instrument request storage stack is empty; if it is empty, determines whether the number of remote instrument call requests this time is less than or equal to 1; if the number of remote instrument call requests this time is less than or equal to 1, pushes the remote instrument call request into the instrument request execution stack, executes the remote instrument call request according to the instrument request execution stack, and prints the instrument operation information; and if the number of remote instrument call requests this time is greater than 1 or the instrument request storage stack is not empty, acquires test times corresponding to the remote instrument call requests.

After acquiring test times corresponding to the remote instrument call requests, it is determined whether there is a new remote instrument call request inserted into the instrument request execution stack. If there is no new remote instrument call request inserted at present, the remote instrument call requests are inserted into the instrument request execution stack in the order of long test time first in and short test time last in, the instrument request execution stack forms a request execution sequence table, the request at the top of the stack is executed, and then, the instrument operation information is printed. If there is a new remote instrument call request inserted at present, test time corresponding to each new remote instrument call request is acquired, and all remote instrument call requests are sorted in the order of the test times from short to long; then, the remote instrument call requests are inserted into the instrument request execution stack in the order of long test time first in and short test time last in, the instrument request execution stack forms a request execution sequence table, and the request at the top of the stack is executed; and then, the instrument operation information is printed.

The instrument service call processing module 40 controls the test instrument 20 to test the to-be-tested chips that actually need to be tested according to the request execution sequence table, and sends instrument operation information (including the request execution sequence table, etc.) to the chip test case module 30 through the protocol buffers.

4. The chip test case module 30 saves the test data (including the request execution sequence table, etc.) to the master database 521 over network during the test process. The master database 521 is synchronized with the slave database 522 in data by recording the database change to the binary log 523. The website for data analysis sends a read command to the slave database 522 in real time through an ajax request, so as to dynamically display the data on the website and realize the visual display of the test data.

5. The chip test case module 30 is connected to the main control board 12 of the STM32 controller or FPGA controller through a serial port during the test process, and sends a control command to the main control board 12 of the STM32 controller or FPGA controller to control the chip registers, for example, to control the chip registers to initialize, etc.

The GRPC-based chip test method, the GRPC-based chip test apparatus, and the storage medium in the embodiments of the present application can realize not only the distributed testing of multiple chips at the same time, but also the separation of test logic and instrument control by using the remote call service. The test speed of chips and the utilization of instruments are effectively improved, the test resources are optimized, and thus the test cost is reduced.

The application of the embodiments of the present invention at least has the following beneficial effects.

In the GRPC-based chip test method provided in the embodiment of the present application, first, the number of to-be-tested chips that actually need to be tested among to-be-tested chips is determined, and a corresponding number of remote instrument call requests are issued according to the number of to-be-tested chips that actually need to be tested; then, each of the remote instrument call requests is acquired based on a GRPC protocol; and then, all the remote instrument call requests are sorted to form a request execution sequence table, and the test instrument is controlled to sequentially test the to-be-tested chips that actually need to be tested according to the request execution sequence table.

Since the GRPC protocol has the characteristics of multiplexing requests, it can process multiple requests and responses at the same time. Therefore, in the embodiment of the present application, based on the GRPC protocol, at least one remote instrument call request can be simultaneously acquired, and response can be made to each remote instrument call request.

By the GRPC protocol, the chip test method in the present application can perform distributed testing on a plurality of to-be-tested chips at the same time. The test speed and test efficiency of chips are effectively improved. The test performed according to the request sequence table can effectively improve the use efficiency and utilization of the test instruments, optimize test resources, and thus reduce the test time and test cost.

It may be understood by a person of ordinary skill in the art that the operations, methods, steps in the flows, measures and solutions already discussed in the present application may be alternated, changed, combined or deleted. Further, the operations, methods, other steps in the flows, measures and solutions already discussed in the present application may also be alternated, changed, rearranged, decomposed, combined or deleted. Further, prior arts having the operations, methods, the steps in the flows, measures and solutions already discussed in the present invention may also be alternated, changed, rearranged, decomposed, combined or deleted.

In the description of the present application, orientations or location relationships indicated by terms such as "center", "up", "down", "front", "behind", "left", "right", "vertical", "horizontal", "top", "bottom", "inside" and "outside" are orientations and location relationships illustrated in the accompanying drawings, merely for ease of describing or simplifying the embodiments of the present application, rather than to indicate or imply that the stated apparatus or elements must have a specific orientation and be constructed and operated in a specific orientation, and shall not be regarded as any limitation to the present application.

The terms "first" and "second" are simply used for the purpose of description, and should not be regarded as indicating or implying relative importance or implicitly indicating the number of indicated technical features. Therefore, the features defined as "first" and "second" may explicitly or implicitly include one or more of the features. In the description of the present invention, unless specifically stated otherwise, "a plurality of" means "two" or "more than two".

In the description of the present application, it should be noted that, unless another clear specification and definition, terms "mount", "connect with each other" and "connect" should be understood in a broad sense, for example, it can be fixedly connected, and it can also be detachably connected or integrally connected; and it can be directly connected with each other, and it can also be connected with each other by intermediary and it can be internally connected between two elements. For a person of ordinary skill in the art, the specific meaning of the above mentioned terms in the present application can be understood in specific circumstances.

In the description, the specific features, structures, materials, or characteristics may be combined in a proper manner in any one or more embodiments or examples.

It should be understood that although the steps in the flowchart shown in the drawings are sequentially displayed by following the arrows, these steps are not necessarily performed in the order indicated by the arrows. Unless explicitly stated herein, in some implementation scenarios of the embodiments of the present application, the steps in the flowcharts may be executed in other sequences as required. In addition, based on actual implementation scenarios, some or all of the steps in the flowcharts may include multiple sub-steps or multiple stages. Some or all of these sub-steps or stages may be executed at the same time, or may be executed at different times. In scenarios with different execution times, the execution order of these sub-steps or stages may be flexibly configured according to requirements, and will not be limited in the embodiments of the present application.

The foregoing descriptions are merely some implementations of the present application. It should be noted that, to a person of ordinary skill in the art, without departing from the technical concept of the solutions of the present application, the use of other similar implementation means based on the technical concept of the present application also belongs to the protection scope of the embodiments of the present application.

What is claimed is:

1. A GRPC-based chip test method, used to test to-be-tested chips using a test instrument, the GRPC-based chip test method comprising:
    using a GPRC client to determine a number of to-be-tested chips that actually need to be tested among the to-be-tested chips, the GPRC client is connected in communication to the plurality of to-be-tested chips and is configured to issue a corresponding number of remote instrument call requests according to the number of to-be-tested chips that actually need to be tested;
    using a GPRC server to acquire each of the remote instrument call requests based on a GRPC protocol, the GPRC server is connected in communication to the GRPC client through GRPC; and
    using the GPRC server to sort all the remote instrument call requests to form a request execution sequence table, and control the test instrument to sequentially test the to-be-tested chips that actually need to be tested according to the request execution sequence table.

2. The GRPC-based chip test method according to claim 1, wherein before the GPRC server sorting all the remote instrument call requests to form a request execution sequence table, further comprising:
    inserting each of the acquired remote instrument call requests into an instrument request storage stack;
    directly forming the request execution sequence table from the instrument request storage stack, if a number of original remote instrument call requests in the instrument request storage stack is 0 and the number of the inserted remote instrument call requests is less than or equal to 1; otherwise sorting all the remote instrument call requests to form a request execution sequence table.

3. The GRPC-based chip test method according to claim 2, wherein the GPRC server sorting all the remote instrument call requests to form a request execution sequence table comprises:

acquiring test times corresponding to each of the remote instrument call requests; and sorting each of the remote instrument call requests according to an order of the test times from short to long to generate the request execution sequence table.

4. The GRPC-based chip test method according to claim 3, wherein before the GPRC server sorting each of the remote instrument call requests according to the order of the test times from short to long to generate the request execution sequence table, further comprising:

if a new remote instrument call request is inserted into the instrument request storage stack, acquiring test time corresponding to the new remote instrument call request, and sorting all the remote instrument call requests according to the order of the test times from short to long; otherwise sorting each of the remote instrument call requests according to the order of the test times from short to long to generate the request execution sequence table.

5. The GRPC-based chip test method according to claim 3, wherein the GPRC server sorting each of the remote instrument call requests according to the order of the test times from short to long to generate the request execution sequence table comprises:

inserting each of the remote instrument call requests into an instrument request execution stack in an order of long test time first in and short test time last in, the instrument request execution stack forming the request execution sequence table.

6. The GRPC-based chip test method according to claim 4, wherein the GPRC server sorting each of the remote instrument call requests according to the order of the test times from short to long to generate the request execution sequence table comprises:

inserting each of the remote instrument call requests into an instrument request execution stack in an order of long test time first in and short test time last in, the instrument request execution stack forming the request execution sequence table.

7. The GRPC-based chip test method according to claim 1, wherein the GPRC server controlling the test instrument to sequentially test the to-be-tested chips that actually need to be tested according to the request execution sequence table comprises:

calling the corresponding test instrument according to the request execution sequence table, and controlling the test instrument to sequentially test the to-be-tested chips that actually need to be tested according to test times corresponding to the remote instrument call requests in the request execution sequence table.

8. The GRPC-based chip test method according to claim 2, wherein the GPRC server controlling the test instrument to sequentially test the to-be-tested chips that actually need to be tested according to the request execution sequence table comprises:

calling the corresponding test instrument according to the request execution sequence table, and controlling the test instrument to sequentially test the to-be-tested chips that actually need to be tested according to test times corresponding to the remote instrument call requests in the request execution sequence table.

9. The GRPC-based chip test method according to claim 3, wherein the GPRC server controlling the test instrument to sequentially test the to-be-tested chips that actually need to be tested according to the request execution sequence table comprises:

calling the corresponding test instrument according to the request execution sequence table, and controlling the test instrument to sequentially test the to-be-tested chips that actually need to be tested according to test times corresponding to the remote instrument call requests in the request execution sequence table.

10. The GRPC-based chip test method according to claim 4, wherein the GPRC server controlling the test instrument to sequentially test the to-be-tested chips that actually need to be tested according to the request execution sequence table comprises:

calling the corresponding test instrument according to the request execution sequence table, and controlling the test instrument to sequentially test the to-be-tested chips that actually need to be tested according to test times corresponding to the remote instrument call requests in the request execution sequence table.

11. The GRPC-based chip test method according to claim 1, further comprising: the GPRC client transmitting test data to a web server and a database server to store test data, wherein the GPRC client is connected in communication to the web server and the database server.

12. A GRPC-based chip test apparatus, used to implement the GRPC-based chip test method as described in claim 1, comprising:

a plurality of to-be-tested chips;

a test instrument configured to connect to the plurality of to-be-tested chips;

a GRPC client connected to the plurality of to-be-tested chips, the GRPC client is configured to issue a corresponding number of remote instrument call requests according to the number of to-be-tested chips that actually need to be tested; and a GRPC server connected in communication to the GRPC client through GRPC, and the GRPC server is configured to acquire each of the remote instrument call requests based on a GRPC protocol, sort all the remote instrument call requests to form a request execution sequence table, and control the test instrument to sequentially test the to-be-tested chips that actually need to be tested according to the request execution sequence table.

13. The GRPC-based chip test apparatus according to claim 12, further comprising:

a website server and a database server, to which the GRPC client is connected to transmit test data to the website server and the database server for storage.

14. The GRPC-based chip test apparatus according to claim 12, wherein before the GRPC server sorting all the remote instrument call requests to form a request execution sequence table, further comprising:

inserting each of the acquired remote instrument call requests into an instrument request storage stack;

directly forming the request execution sequence table from the instrument request storage stack, if a number of original remote instrument call requests in the instrument request storage stack is 0 and the number of the inserted remote instrument call requests is less than or equal to 1; otherwise sorting all the remote instrument call requests to form a request execution sequence table.

15. The GRPC-based chip test apparatus according to claim 14, wherein the GRPC server sorting all the remote instrument call requests to form a request execution sequence table comprises:

acquiring test times corresponding to each of the remote instrument call requests; and sorting each of the remote instrument call requests according to an order of the test times from short to long to generate the request execution sequence table.

16. The GRPC-based chip test apparatus according to claim 15, wherein before the GRPC server sorting each of the remote instrument call requests according to the order of the test times from short to long to generate the request execution sequence table, further comprising:

if a new remote instrument call request is inserted into the instrument request storage stack, acquiring test time corresponding to the new remote instrument call request, and sorting all the remote instrument call requests according to the order of the test times from short to long; otherwise sorting each of the remote instrument call requests according to the order of the test times from short to long to generate the request execution sequence table.

17. The GRPC-based chip test apparatus according to claim 15, wherein the GRPC server sorting each of the remote instrument call requests according to the order of the test times from short to long to generate the request execution sequence table comprises:

inserting each of the remote instrument call requests into an instrument request execution stack in an order of long test time first in and short test time last in, the instrument request execution stack forming the request execution sequence table.

18. The GRPC-based chip test apparatus according to claim 12, wherein controlling the test instrument to sequentially test the to-be-tested chips that actually need to be tested according to the request execution sequence table comprises:

the GRPC server calling the corresponding test instrument according to the request execution sequence table, and controlling the test instrument to sequentially test the to-be-tested chips that actually need to be tested according to test times corresponding to the remote instrument call requests in the request execution sequence table.

19. A non-transitory computer-readable storage medium having programs, codes or instructions stored thereon that, when executed by at least one processor, implement the GRPC-based chip test method described in claim 1.

* * * * *